United States Patent
Kawasaki

(10) Patent No.: US 10,805,500 B2
(45) Date of Patent: Oct. 13, 2020

(54) IMAGE READING DEVICE

(71) Applicant: CANON KABUSHIKI KAISHA, Tokyo (JP)

(72) Inventor: Shigeru Kawasaki, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/523,899

(22) Filed: Jul. 26, 2019

(65) Prior Publication Data

US 2020/0036854 A1 Jan. 30, 2020

(30) Foreign Application Priority Data

Jul. 30, 2018 (JP) .................................. 2018-142536

(51) Int. Cl.
*H04N 1/04* (2006.01)
*H04N 1/10* (2006.01)
*H04N 1/00* (2006.01)

(52) U.S. Cl.
CPC ....... *H04N 1/1065* (2013.01); *H04N 1/00525* (2013.01); *H04N 1/00551* (2013.01); *H04N 1/00557* (2013.01); *H04N 1/1043* (2013.01); *H04N 2201/0081* (2013.01)

(58) Field of Classification Search
CPC .................................................. H04N 1/1065
See application file for complete search history.

(56) References Cited

U.S. PATENT DOCUMENTS

| | | | | |
|---|---|---|---|---|
| 5,521,681 A | * | 5/1996 | Nimura | G03G 15/04045 399/102 |
| 6,829,065 B1 | * | 12/2004 | Lee | H04N 1/1065 248/200 |
| 6,985,269 B1 | | 1/2006 | Takeuchi | |
| 2002/0084401 A1 | * | 7/2002 | Tsai | F16M 7/00 248/650 |
| 2008/0158619 A1 | | 7/2008 | Osakabe | |
| 2015/0381835 A1 | | 12/2015 | Takabayashi | |
| 2016/0094739 A1 | * | 3/2016 | Xie | H04N 1/00525 358/474 |

FOREIGN PATENT DOCUMENTS

JP 2016-10100 A 1/2016

* cited by examiner

*Primary Examiner* — Cheukfan Lee
(74) *Attorney, Agent, or Firm* — Canon U.S.A., Inc. IP Division

(57) ABSTRACT

An image reading device comprises a document table having a plate-shaped transparent member for a document to be placed thereon, an image reading unit for reading the document placed on the upper surface of the transparent member from the lower surface side of the transparent member, a carriage for driving the image reading unit to move reciprocally, and a case for containing the carriage. The document table has a frame member along a periphery of the transparent member and is secured to the case by engagement right under the frame member.

6 Claims, 7 Drawing Sheets

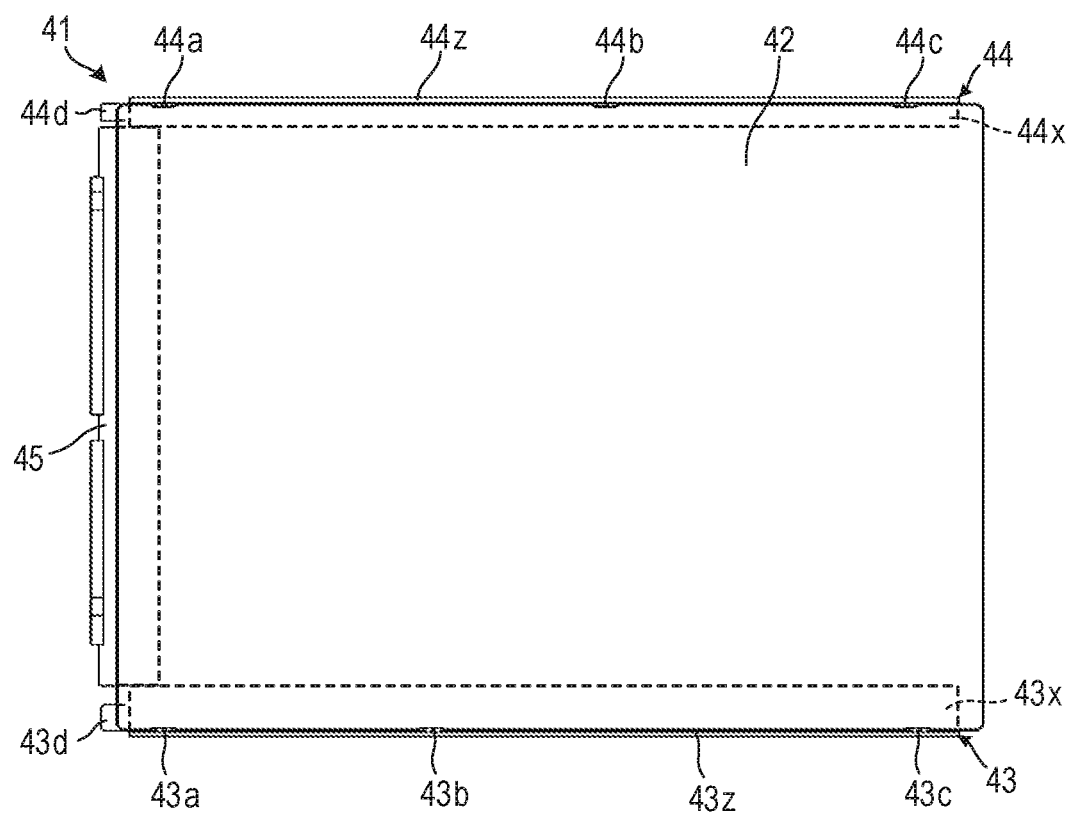

IMAGE READING DEVICE

BACKGROUND

Field of the Disclosure

The present disclosure relates to an image reading device for reading document images.

Description of the Related Art

Image reading devices for reading document images are currently available particularly in the form of image scanners, copying machines, fax machines and various multi-functional machines (also referred to as multi-functional printers) having an image-reading function among others. Of various image reading devices, so-called flatbed type ones are equipped with a document table, which is a plate-shaped transparent member typically made of glass, and a read sensor such that the read sensor is driven to move below the transparent member to read the document placed on the transparent member. A one-dimensional image sensor (linear image sensor) having a length that can cover the largest width of documents that can be placed on the document table is generally employed for the read sensor. The moving direction of the read sensor is the direction orthogonal relative to the direction in which the one-dimensional image sensor extends, which is normally referred to as main scanning direction, and is referred to as sub-scanning direction. A frame member or frame members is/are arranged around the transparent member on the document table for the purpose of securely holding the transparent member in position and serving for the operation of placing the document to be read also in position. The document table is fitted to a case, or a housing member, of the image reading device as the frame member(s) is/are rigidly secured to the case. In a flatbed type image reading device, the plate-shaped transparent member, which may typically be a glass plate, is normally held horizontal relative to the gravity direction in use. In the following description, the direction perpendicular to the surface of the plate-shaped transparent member is referred to as vertical direction.

In recent years, the trend of downsizing the main bodies of image reading devices has been in progress in response to the progress of the trend of downsizing the read sensor-containing image reading units of image reading devices. The dominant factors of determining the installation area, the size in the main scanning direction in particular, of a flatbed type image reading device are as follows:

(1) the length in the main scanning direction of the read sensor-containing image reading unit;

(2) the width(s) of the frame member(s) for holding the transparent member of the document table;

(3) the clearance(s) between the frame member(s) of the document table and the image reading unit;

(4) the thicknesses of the components of the frame member(s) and those of the exterior parts of the case; and (5) the method of securing or binding the frame member(s) and the case together (the method of preventing possible separation of the frame member(s) and the case in the vertical direction in particular).

The frame member(s) of the document table is/are fitted to the case so as to cover peripheral areas of the case from above in the vertical direction in any of the existing image reading devices and therefore the engagement means for binding the case and the frame member(s) of the document table together is/are arranged outside the transparent member. Then, as a result of providing the engagement means in such a manner, the size of the image reading device in the main scanning direction is inevitably raised accordingly. Japanese Patent Application Laid-Open No. 2016-010100 discloses a method of removably fitting the document table to the case by bringing a rectangular-shaped member extending downward from the frame member of the document table and hooks arranged at the case into mutual engagement.

In the instance of the known image reading device disclosed in the above cited patent document, the device is accompanied by the problem that the size of the device is increased in the main scanning direction by the sizes of the engagement means employed for fitting the document table to the case. More specifically, the disclosed method makes use of deflection of some of the members of the mutual engagement means in order to removably fit the document table to the case. Then, however, the deflecting members also need to be downsized in order to downsize the entire image reading device and accordingly there arises a problem that it is difficult to secure a satisfactory degree of strength for the engagement means.

In view of the above-identified problems of the known image reading devices, it is therefore an object of the present invention to provide an image reading device that allows downsizing while securing a satisfactory degree of strength for the engagement means for binding the case and the document table together.

SUMMARY

An image reading device according to the present invention comprises: a document table having a plate-shaped transparent member for a document to be placed thereon; an image reading unit configured to read the document placed on an upper surface of the transparent member from a lower surface side of the transparent member, the image reading unit extending in a main scanning direction; a carriage for driving the image reading unit to reciprocally move in a sub-scanning direction, the sub-scanning direction being a direction intersecting the main scanning direction; a case for containing the carriage, the case having a support portion for supporting the document table from the lower surface side of the transparent member; and a frame member arranged along a peripheral edge of the transparent member; the case and the frame member being mutually engaged with each other at an underside of the support portion as viewed in a vertical direction.

Thus, according to the present invention, the engagement section for holding the document table and the case in mutual engagement is arranged at the underside of the support portion for supporting the peripheral edge of the document table and therefore the support portion does not raise the size of the image reading device. Thus, according to the present invention, it is possible to downsize image reading devices of the type under consideration without downsizing the engagement section while the engagement section can secure a satisfactory degree of strength.

Further features of the present invention will become apparent from the following description of exemplary embodiments with reference to the attached drawings.

BRIEF DESCRIPTION OF THE DRAWINGS

FIG. 5 is a schematic view of the rear surface of the document table unit of the embodiment of image reading device shown in FIG. 1.

DESCRIPTION OF THE EMBODIMENTS

Figure 1:
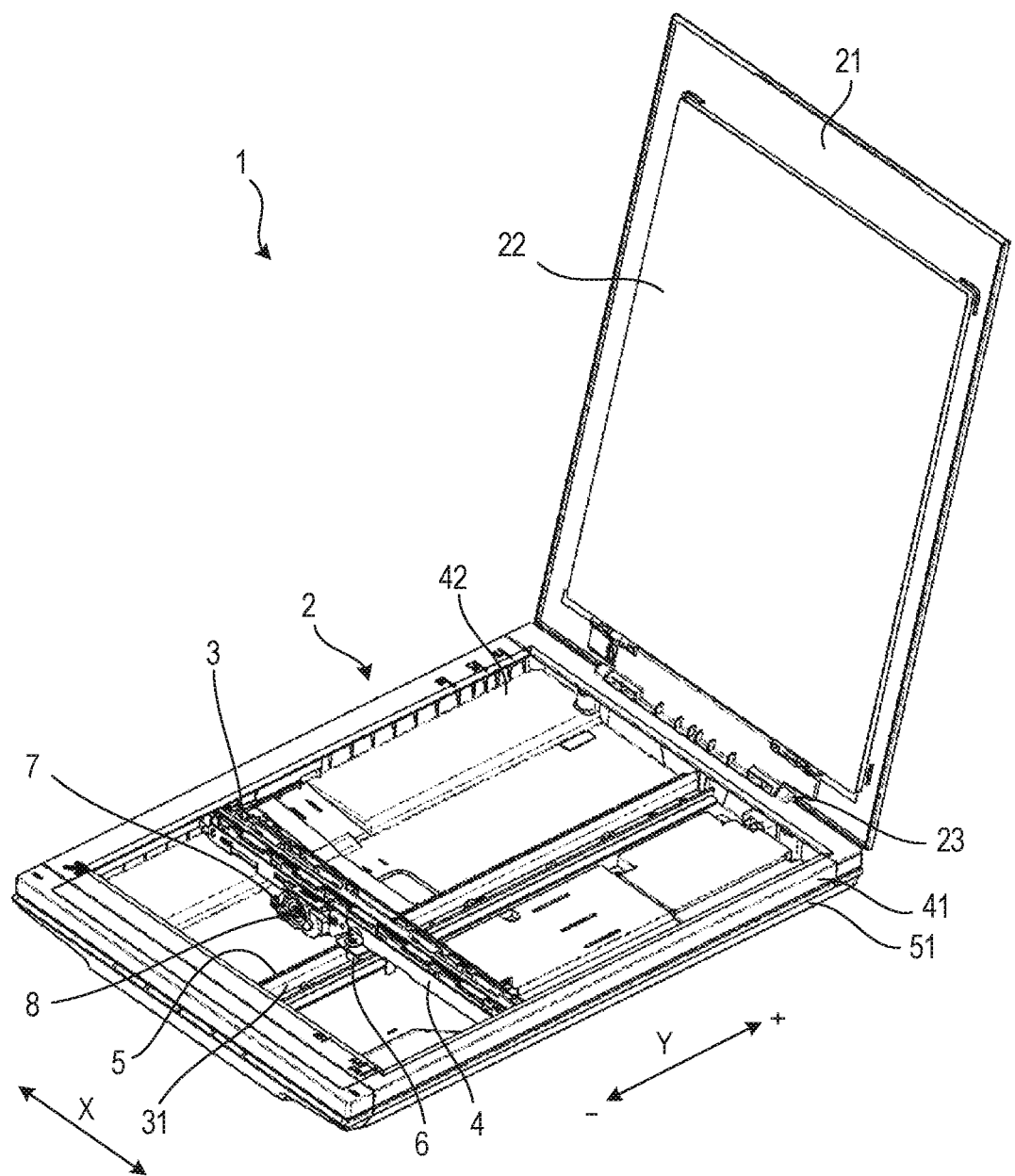
FIG. 1 is a schematic perspective view of an embodiment of image reading device according to the present invention.

Now, an embodiment of the present invention will be described below by referring to the drawings. FIG. 1 is a schematic perspective view of an image reading device 1, which is an embodiment of the present invention, with its document cover 21 held in an open state. The image reading device 1 comprises a device main body 2 and the document cover 21 fitted to the device main body 2. The device main body 2 includes a document table unit 41 arranged as an upper part of the device main body 2. The document table unit 41 in turn includes a glass-made document table 42 which is a plate-shaped transparent member for a document to be placed thereon. The document table unit 41 is rigidly secured to a case unit 51, which is the housing (case) of the image reading device 1. Thus, the device main body 2 comprises the document table unit 41 and the case unit 51. How the document table unit 41 is fitted to the case unit 51 will be described hereinafter. The document cover 21 is a pressing member for pressing the document placed on the top surface of the glass-made document table 42 against the glass-made document table 42. The document cover 21 is fitted to the device main body 2 by means of a hinge section 23 so as to make it openable and closable relative to the device main body 2. A resilient document-pressing sheet 22, which is formed by using a sheet member and a sponge, is bonded to the pressing surface of the document cover 21.

The image reading device 1 is a flatbed type device and the glass-made document table 42 has a rectangular profile. The size of the glass-made document table 42 defines the largest size for documents that can be read by the image reading device 1. The direction running along the short sides of the glass-made document table 42 is the main scanning direction of the image reading device 1. In the following description, the main scanning direction is also referred to as the X-direction and the direction running along the long sides of the glass-made document table 42 is referred to as the Y-direction (sub-scanning direction). The direction that is perpendicular to the surface of the glass-made document table 42 is referred to as the Z-direction. When the image reading device 1 is normally operated, the X and Y directions are horizontal directions and the Z-direction is the gravity direction or the vertical direction, which is the height direction of the device 1. When the main body of the image reading device 1 is observed from the front side thereof, the X-direction is the transverse direction and the Y-direction is the depth direction. As for the Y-direction (sub-scanning direction), the side of the device at which the document cover 21 is fitted to the device main body is referred to the +Y direction, whereas the front side is referred to as the −Y direction.

A read sensor 3 that is movable in the Y-direction (sub-scanning direction) along the lower surface of the glass-made document table 42 is arranged in the inside of the image reading device 1. The read sensor 3, which is an image reading unit, is formed by using a one-dimensional contact image sensor extending in the main scanning direction (X-direction) and mounted on a carriage 4. In the inside of the image reading device 1, a rack member 5 and a guide rail 31, both of which extend in the Y-direction, are arranged on the bottom surface of the main body of the image reading device 1. The carriage 4 is guided and supported so as to be reciprocally movable in the Y-direction along the rack member 5. The carriage 4 is also held in sliding contact with the guide rail 31 by way of the slider 6 rigidly fitted to the lower surface of the carriage 4. The slider 6 is a guide section that is held in engagement with the guide rail 31. As the drive force exerted by the motor 7 arranged at the carriage 4 is transmitted to a train of gears 8, the carriage 4 is driven to move along the rack member 5 in the Y-direction. Then, as a result, the read sensor 3 moves with the carriage 4 along the lower surface of the glass-made document table 42 in the Y-direction to read the image on the lower surface of the document placed on the upper surface of the glass-made document table 42.

Figure 2:
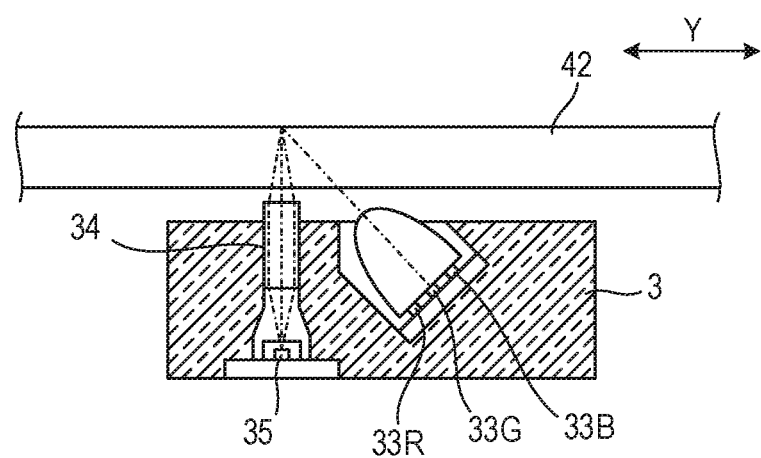
FIG. 2 is a schematic cross-sectional view of the read sensor of the embodiment of image reading device shown in FIG. 1.

FIG. 2 is a schematic cross-sectional view of the read sensor 3 of the embodiment of image reading device taking along the Y-Z plane. Light emitting elements (e.g. light emitting diodes (LEDs)) of the three primary colors (red, green and blue) 33R, 33G, 33B, a rod lens array 34 and a light receiving element (image sensor) 35 are incorporated in the inside of the read sensor 3. The rays of light emitted from the light emitting elements 33R, 33G, 33B, transmitted through the glass-made document table 42 and irradiated onto the document are then reflected by the surface of the document. Then, the reflected rays of light are transmitted through the glass-made document table 42 and the rod lens array 34 to form an image of the document on the image sensor 35. The read sensor 3 sequentially turns on the light emitting elements 33R, 33G, 33B and the image sensor 35 reads the reflected rays of light of the three primary colors from the document for the purpose of color separation and color image readings.

Figure 3:
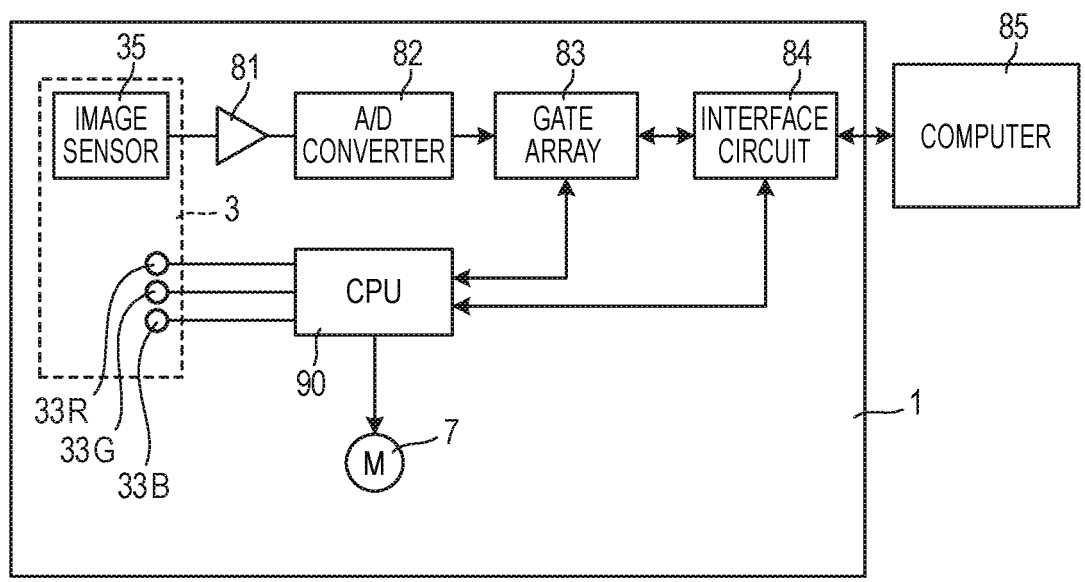
FIG. 3 is a block diagram of the data processing section of the embodiment of image reading device shown in FIG. 1.

FIG. 3 schematically illustrates the configuration of the data processing section, or the data processing circuit, of the image reading device 1 of this embodiment. The data processing section processes the data obtained by the read sensor 3 as a result of reading a document image. Referring to FIG. 3, the image sensor 35 detects the rays of light reflected from the document on the document table in synchronism with the operation of sequentially emitting light by the light emitting elements 33R, 33G, 33B, which are sequentially turned on for this operation, and outputs an image output signal. The image output signal is then transmitted to an amplifier 81. The amplified image output signal is then converted into a digital video signal using an A/D (analog/digital) converter 82. The A/D converter 82 has resolving power of N bits (N being an integer) and divides the dynamic range (difference between the output for a pure white part and the output for a pure black part on the document that is being read) of the image sensor 35 by 2N and assigns a gradation value to each level of brightness on the document. For example, when an A/D converter 82 having resolving power of 8 bits is employed, it can identify a total of 256 gradation levels between pure white and pure black and, when an A/D converter 82 having resolving power of 10 bits is employed, it can identify a total of 1,024 gradation levels between pure white and pure black. Therefore, when an A/D converter 82 having resolving power of 8 bits is employed, it can identify a total of 24 bits, or about 16.70 million colors, when reading the rays of color light coming from light sources of red, green and blue. Likewise, when an A/D converter 82 having resolving power of 10 bits is employed, it can identify a total of 30 bits, or about 1.074 billion colors, when reading the rays of color light coming from light sources of red, green and blue.

The digital video signal from the A/D converter 82 is then transmitted to gate array 83. The gate array 83 is designed to operate as image processing circuit and can output, by way of an interface circuit 84, the outcome of each image processing operation it has executed to a computer 85, which may typically be a personal computer arranged outside the image reading device 1. The image reading device 1 further comprises a CPU (central processing unit) 90 for controlling the operation of the read sensor 3 and that of the motor 7 of the carriage 4 among others. The extent of drive operation of the motor 7, the operation of the gate array 83 and the operation of interface circuit 84 are also controlled by the CPU 90. The amplifier 81, the A/D converter 82, the gate array 83, the interface circuit 84 and the CPU 80 are mounted on a control board and electrical equipment section (not shown) that includes the control board and a power source is arranged in the inside of the device main body 1. The read sensor 3 and the motor 7 that are arranged on the carriage 4 are electrically connected to the electrical equipment section by way of a flat cable 55 (see FIG. 4).

The video signal from the image reading device 1 can be output in any of several different modes. In other words, a suitable mode can be selected depending on the application of the read image. When the document contains only characters, it is read so as to be treated as target of OCR (optical character recognition) or when a monochromatic line drawing is read out, a monochromatic binary signal is suitably output as video signal. In such an instance, for example, only the light emitting element 33G is turned on out of the light emitting elements 33R, 33B, 33G of the three primary colors (red, blue, green) to obtain a video signal and video data that is data binarized by the image processing circuit, which is incorporated in the gate array 83, by using a desired threshold value is output. When the document contains a photograph or some other picture and is read for the purpose of outputting the read data to a monochromatic printer, again only the light emitting element 33G is turned on and the obtained video signal is binarized by way of an half tone processing operation using a dither method, an error diffusion method or the like. Then, the binarized video data is output. When, on the other hand, the document contains a color image that needs to be processed, multivalued (e.g., 24 bits) video data is preferably output. After passing through the gate array 83, which operates as image processing circuit, the video signal is output to the computer 85 or some other device by way of the interface circuit 84.

Figure 4:
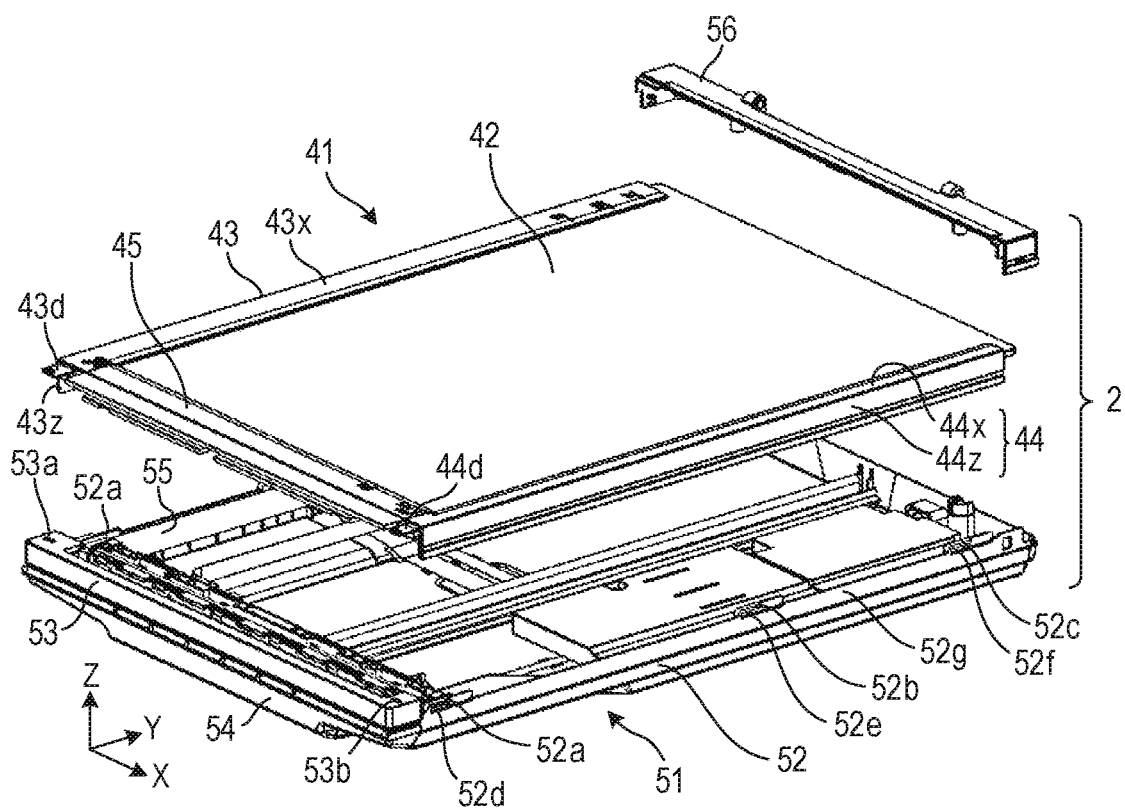
FIG. 4 is an exploded schematic perspective view of the embodiment of image reading device shown in FIG. 1, where the document cover is removed.

Now, the device main body 2 will be described in greater detail below. FIG. 4 is an exploded schematic perspective view of the embodiment of image reading device shown in FIG. 1, showing the exterior configuration thereof, but the document cover is removed in FIG. 4. FIG. 5 is a schematic view of the rear surface of the document table unit 41 as viewed from the side of the case unit 51. As pointed out earlier, the device main body 2 includes the document table unit 41 for placing a document thereon and holding the placed document in position and the case unit 51. The case unit 51 surrounds the movable region of the read sensor 3 that is driven to reciprocally move in the Y-direction (sub-scanning direction) along with the carriage 4 and places the document table unit 41 in position in terms of the X-, Y- and Z-directions. The document table unit 41 is fitted to the case unit 51. The document table unit 41 includes a left side frame member 43, a right side frame member 44 and a front side frame member 45 for holding the glass-made document table 42 in position, the left side frame member 43, the right side frame member 44 and the front side frame member 45 being rigidly secured to each other by means of a double-sided tape or the like (not shown). The frame members 43 and 44 are oblong members arranged along the oppositely disposed long sides of the glass-made document table 42 and show an L-shaped cross section. The frame members 43 and 44 are arranged symmetrically as viewed from above. The frame members 43 and 44 respectively have protrusions 43d and 44d at the front ends thereof (opposite to the ends where the document cover 21 is arranged) that project forwardly in the longitudinal direction of the frame members 43 and 44.

The frame member 43 shows an L-shaped cross section and therefore it may be regarded as a member formed by bonding two oblong plate-shaped portions 43x and 43z so as to produce an angle of 90° between them. One of the plate-shaped portions, or the plate-shaped portion 43x, is bonded to the top surface of the glass-made document table 42, while the other plate-shaped portion 43z projects downward in the Z-direction, in other words perpendicularly relative to the lower surface of the glass-made document table 42. Similarly, the frame member 44 has a plate-shaped portion 44x bonded to the top surface of the glass-made document table 42 and another plate-shaped portion 44z projecting downward in the Z-direction, in other words, perpendicularly relative to the lower surface of the glass-made document table 42. Of the two plate-shaped portions 43x and 43z of the frame member 43, the plate-shaped portion 43z that projects downward in the Z-direction has three protrusions 43a-43c sequentially arranged in the longitudinal direction of the frame member 43 (and hence in the Y-direction). Similarly, the plate-shaped portion 44z of the frame member 44 has three protrusions 44a-44c.

As shown in FIG. 4, the case unit 51 is assembled to include the exterior covers of the image reading device 1. The exterior covers in turn include a base frame 52 that takes a major exterior portion of the device main body 2, a front cover 53 for placing the document table unit 41 in position in the X-Y directions and rigidly holding the document table unit 41 and a panel cover 54 for covering the switch board (not shown) and its surroundings. Switches to be used to operate the image reading device 1 are arranged on the switch board. The base frame 52 has an opening at the top surface (the surface at the side of the document table unit) and wall-shaped portions 52g are formed along the respective lateral edges of the opening and projecting upward. The wall-shaped portions 52g are arranged at respective positions where the case unit 51 is upwardly exposed and extend in the direction in which the carriage 4 is driven to reciprocate, or in the sub-scanning direction. Each of the wall-shaped portions 52g which are arranged at the opposite ends of the base frame 52 as viewed in the X-direction, has three glass supporting portions 52a-52c for supporting the glass-made document table 42 in the gravitational direction so as to project upward further from the wall-shaped portion 52g. The glass supporting portions 52a-52c of each of the wall-shaped portions 52g are support portions that support the glass-made document table 42, which is a transparent member, at the under surface thereof. Since the base frame 52 is provided with two wall-shaped portions 52g, there are a total of six glass supporting portions 52a-52c. In the above-described instance, the six glass supporting portions 52a-52c are arranged at laterally symmetrical positions. The glass supporting portions 52a-52c are formed to show flat and horizontal top surfaces for supporting the glass-made document table 42 thereon. As will be described hereinafter, when the document table unit 41 is fitted to the case unit 51, the top surfaces of the glass supporting portions 52a-52c come to contact the lower surface of the glass-made document table 42 so as to support the glass-made document table 42 from under in the gravitational direction. While the glass supporting portions 52a-52c are arranged at laterally symmetrical positions in the above description, they may not necessarily be arranged at laterally symmetrical positions and the number of glass supporting portions may not necessarily be six provided that they can stably and reliably support the glass-made document table 42. The glass supporting portions 52a-52c are formed as so many projections that project upward from the wall-shaped portions 52g and provided at middle parts of their heights with respective stopper grooves 52d-52f. The stopper grooves 52d-52f are provided in order to prevent the document table unit 41 from coming off and falling down in the Z-direction (vertical direction). They are so many slits, or grooves, formed in the respective glass supporting portions 52a-52c so as to extend in the Y-direction. Thus, when the glass supporting portions 52a-52c are viewed at a position distanced from them in the X-direction, the stopper grooves 52d-52f of the glass supporting portions 52a-52c may show a U-shaped profile. The stopper grooves 52d-52f can respectively be brought into mutual engagement with the protrusions 43a-43c of the frame members 43 and the protrusions 44a-44c of the frame member 44 of the document table unit 41.

Figures 6A, 6B, 6C, 6D:
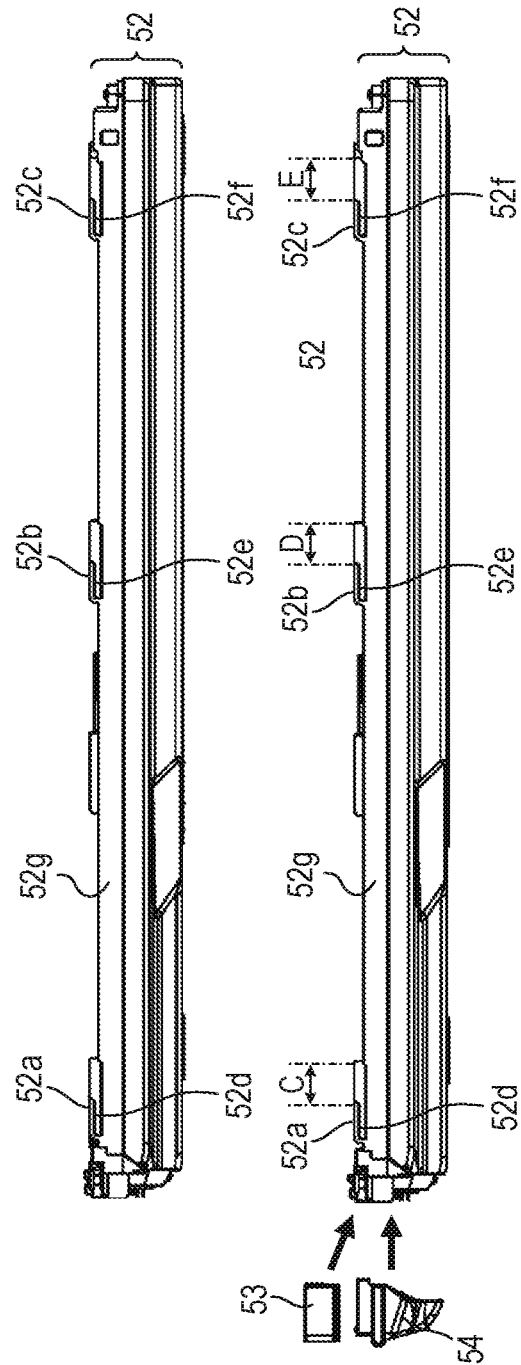
FIGS. 6A, 6B, 6C and 6D are a schematic illustration of the process of assembling the embodiment of image reading device shown in FIG. 1.

FIGS. 6A, 6B, 6C and 6D are a schematic illustration of the sequence of the operation of fitting the document table unit 41 to the case unit 51. Now, the process of assembling the device main body 2 will be described below by referring to FIGS. 6A through 6D particularly in terms of external components of the device. FIG. 6A shows the case unit 51 in a state where the internal components have been assembled before assembling the front cover 53 and the panel cover 54. FIG. 6B shows a state where the front cover 53 and the panel cover 54 are placed and rigidly secured in position relative to the case unit 51. Since the front cover 53 is employed to hold and rigidly secure the document table unit 41, which is the heaviest unit of the image reading device 1, the front cover 53 is desirably rigidly secured to the base frame 52 by means of screws. The panel cover 54 may be snap-fitted to the case unit 51.

Then, in the assembling step shown in FIG. 6C, the document table unit 41 is placed and rigidly secured in position in the case unit 51. At this time, the document table unit 41 is moved in two steps, firstly along arrow A (in the Z-direction) and then along arrow B (in the −Y-direction). Then, as a result, the document table unit 41 is incorporated into the case unit 51 and rigidly secured to the latter. More specifically, firstly the document table unit 41 is placed at a predetermined position located above the case unit 51. The predetermined position refers to the position at which the protrusions 43a-43c of the frame member 43 and the protrusions 44a-44c of the frame member 44 are located right above the regions C-E that are found along the lateral sides of the base frame 52 (see FIG. 6B). These regions C-E are regions where the protrusions 43a-43c of the frame member 43 and the protrusions 44a-44c of the frame member 44 do not interfere with the glass supporting portions 52a-52c even when the protrusions 43a-43c and 44a-44c are moved downward in the direction of arrow A. Thus, as the document table unit 41 is moved downward in the direction of arrow A, the document table unit 41 comes down until it gets into contact with the glass supporting portions 52a-52c of the glass-made document table 42 without interfering with the base frame 52 and becoming deformed. Thereafter, as the document table unit 41 is driven to slide in the direction of arrow B until the document table unit 41 contacts the front cover 53, the document table unit 41 is placed in position in the sub-scanning direction (Y-direction). Additionally, the process of positioning the document table unit 41 in the main scanning direction (X-direction) ends when the protrusions 43d and 44d of the frame members 43 and 44 respectively come into engagement with the engagement sections (not shown) formed in the front cover 53. Subsequently, as the rear cover 56 is moved in the direction of the arrow shown in FIG. 6D so as to be incorporated into and rigidly secured in position relative to the case unit 51, the process of positioning and rigidly securing the document table unit 41 relative to the case unit 51 ends. The rear cover 56 is fitted to one of the opposite ends of the image reading device 1 in the Y-direction (sub-scanning direction). Thus, the rear cover 56 operates as stopper for limiting any move of the document table unit 41 in the +Y-direction. The rear cover 56 includes part of the hinge section 23 for fitting the document cover 21 to the device main body 2 and hence the rear cover 56 is the member where the document cover 21 is connected to the device main body 2.

Figure 7A:
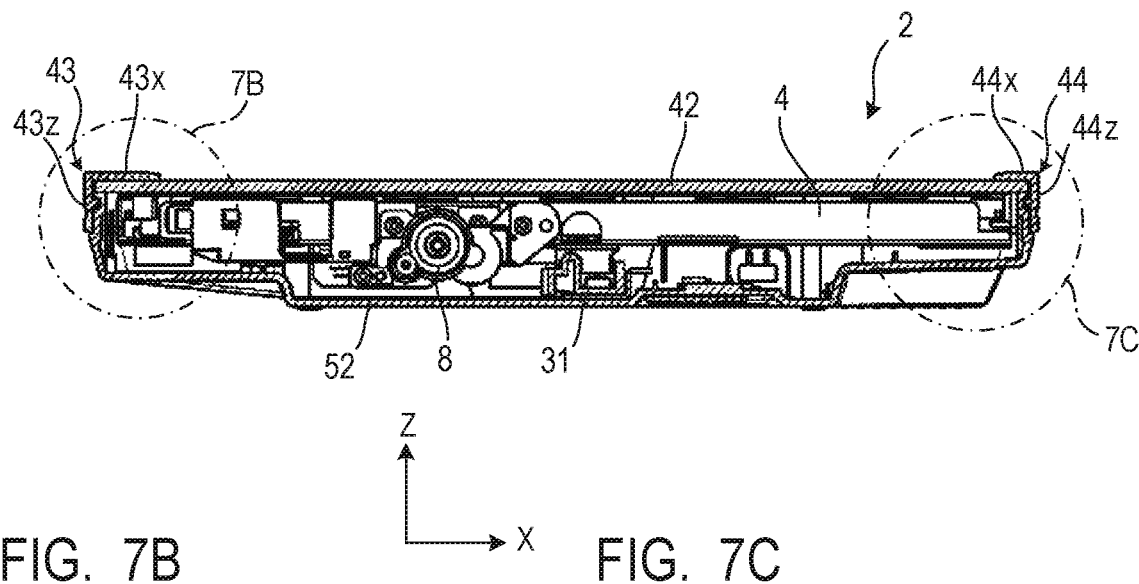
FIGS. 7A, 7B and 7C are schematic cross-sectional views of the embodiment of image reading device shown in FIG. 1.
Figure 7B:
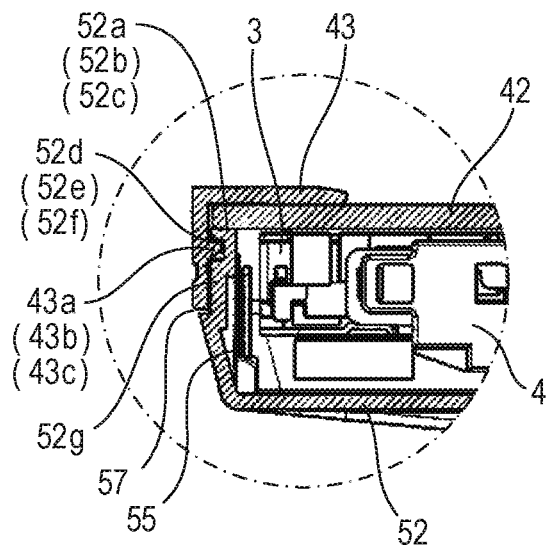
Figure 7C:
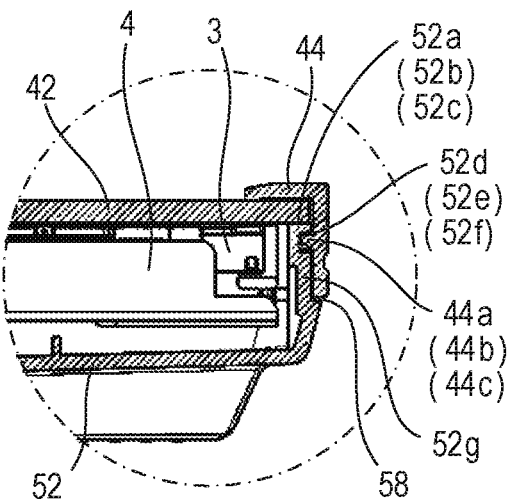

Now, the stopper mechanism for preventing the document table unit 41 from upwardly coming out (in the Z-direction) of this embodiment will be described below. FIG. 7A is a schematic cross-sectional view of the device main body 2 that has been assembled by using the document table unit 41 and the case unit 51 in a manner as described above by referring to FIGS. 6A through 6D. FIGS. 7B and 7C respectively are enlarged views of regions 7B and 7C that are encircled by one-dot chain lines and located at oppositely disposed ends in FIG. 7A. As shown in FIGS. 7B and 7C, the protrusion 43a of the frame member 43 and the protrusion 44a of the frame member 44 are respectively found in the stopper grooves 52d of the base frame 52 and hence they are prevented from moving upward by the inner walls of the stopper grooves 52d. In FIGS. 7A and 7B, the protrusions 43b-43c of the frame member 43 and the stopper grooves 52e-52f of the base frame 52 are not visible because they are apparently respectively hidden by the protrusion 43a and the stopper groove 52d. Similarly, in FIGS. 7A and 7C, the protrusions 44b-44c of the frame member 44 and the stopper grooves 52e-52f of the base frame 52 are not visible because they are apparently respectively hidden by the protrusion 44a and the stopper groove 52d. However, as in the instance of the protrusions 43a and 44a, the protrusions 43b and 44b are prevented from moving upward by the respective stopper grooves 52e and the protrusions 43c and 44c are also prevented from moving upward by the respective stopper grooves 52f. As the protrusions 43a-43c and 44a-44c are prevented from moving upward, the document table unit 41 is prevented from coming out from the case unit 51 accordingly. Thus, the protrusions 43a-43c and 44a-44c and the stopper grooves 52d-52f operate as laterally arranged engagement sections for holding the document table 41 and the case unit 51 in mutual engagement. The laterally arranged engagement sections, the glass supporting portions 52a-52c and the glass-made document table 42 are vertically arranged such that the engagement sections are respectively located below the glass supporting portions 52a-52c. In the illustrated instance, a plurality of engagement sections are provided along the oppositely disposed lateral sides of the glass-made document table 42 that extend in the Y-direction (sub-scanning direction).

Additionally, as viewed in the X-direction, the protrusion 43a of the frame member 43 is located within the region where the corresponding glass supporting portion 52a of the base frame 52 is arranged. Since the glass supporting portion 52a supports the glass-made document table 42 from under, it raises neither the dimension of the document table unit 41 nor that of the case unit 51 in the main scanning direction (X-direction) if the protrusion 43a is arranged within the region of the glass supporting portion 52a. Similarly, the protrusion 44a of the frame member 44 is also located within the region where the corresponding glass supporting portion 52a is arranged as viewed in the X-direction. As for the remaining protrusions, the protrusions 43b and 44b are respectively located within the regions of the glass supporting portions 52b and the protrusions 43c and 44c are respectively located within the regions of the glass supporting portions 52c. Consequently, with the above described arrangement, the structure for preventing the document table unit 41 from coming off is contained within the regions of the base frame 52 for supporting the glass-made document table 42 from under and hence the come-off prevention mechanism does not adversely affect the dimension of the image reading device in the main scanning direction (X-direction).

As described above, of the image reading device 1 of this embodiment, the document table unit 41 that is the heaviest unit among the component units of the device can be incorporated into the case unit 51 without making use of deformation of any of its parts and members. Additionally, the document table unit 41 is prevented from coming off from the device in the Z-direction by utilizing only the regions of the parts of the base frame 52 that participate in supporting the glass-made document table 42. Thus, as a result, the width in the main scanning direction (X-direction) of the image reading device 1 of this embodiment can be minimized.

Now, the exterior configuration of the image reading device 1 of this embodiment produced by the document table unit 41 and the case unit 51 and the relationship between the exterior configuration and the components arranged in the inside of the image reading device 1 such as flat cable 55 will be described below. Generally, a read sensor and electric components such as flat cable that are connected to the read sensor are arranged in the inside of an image reading device of the type under consideration and these internal components are driven to move in order to scan the document to be read. With such an image reading device, when the device is touched by a user who bears static electricity, the electrostatic discharge from the user, if any, can sometimes get to the flat cable and also to the read sensor by way of the gap that can be produced between the case and the document table mounted in the case. If the electrostatic discharge gets to the flat cable and also to the read sensor, the electric circuits and other components arranged in the image reading device can be damaged by the static electricity. Such an adverse effect of electrostatic discharge becomes remarkable when the distance (creeping distance) between the gap and the flat cable and the distance (creeping distance) between the gap and the read sensor are made short. Conversely, if such creeping distances are increased for the purpose of minimizing the adverse effect of electrostatic discharge, there arises a problem of raising the dimensions of the image reading device.

In view of the above-described circumstances, the image reading device 1 of this embodiment is prevented from being adversely affected by electrostatic discharges by increasing such creeping distances as pointed out above without increasing the dimensions of the image reading device, particularly the dimension of the device in the main scanning direction. As described above, the plate-shaped portions 43z and 44z of the frame members 43 and 44 are made to vertically project downward relative to the lower surface of the glass-made document table 42. As shown in FIG. 6D, when the document table unit 41 is rigidly secured to the case unit 51, the plate-shaped portions 43z and 44z of the frame members 43 and 44 are respectively made to stand side by side relative to the wall-shaped portions 52g of the base frame 52 and touch or almost touch the outer lateral surfaces of the wall-shaped portions 52g. The vertical distance by which the plate-shaped portions 43z and 44z are made to almost touch the outer lateral surfaces of the wall-shaped portions 52g is the creeping distance of electrostatic discharges. The surfaces of the frame members 43 and 44 and the corresponding surfaces of the wall-shaped portions 52g that are located side by side and almost touch each other are vertical surfaces in this embodiment and therefore, if the creeping distance is made large, the dimension of the image reading device 1 in the main scanning direction is not increased. Additionally, as the surfaces of the frame members 43 and 44 and the corresponding surfaces of the wall-shaped portions 52g that almost touch each other are made to be vertical surfaces, the document table unit 41 can be moved downward with ease in the direction of arrow A in the assembling step illustrated in FIG. 6C so that the document table unit 41 can also be driven to slide with ease in the direction of arrow B. The effect of alleviating the adverse effect of electrostatic discharges of this embodiment will be described in greater detail below.

Since the carriage 4 is driven to reciprocate in the sub-scanning direction in the inside of the base frame 52, the base frame 52 is provided with inner walls for enclosing the space in which the carriage 4 can move. As shown in FIG. 4, the flat cable 55 that electrically connects the read sensor 3 and the control board (not shown) is arranged along the inner wall of the base frame 52 located at the left side as viewed in the main scanning direction (X-direction) (the remote side inner wall in FIG. 4). FIG. 7B is a schematic cross-sectional view of the image reading device 1 of this embodiment taken along an X-Z plane, showing the positional relationship between the flat cable 55 and the inner wall of the base frame 52 located at the left side as viewed in the main scanning direction. Additionally, FIG. 7B shows a region of the image reading device 1, in which the frame member 43 of the document table unit 41 and the base frame 52 of the case unit 51 contact each other. In the region where the frame member 43 and the base frame 52 contact each other, the plate-shaped portion 43z of the frame member 43 (see FIG. 7A) and the base frame 52 are supposed to be held in tight contact with each other. However, there can arise an instance where they are not held in tight contact with each other but separated from each other with a narrow gap 57 in between. When part, e.g., hand of the user that bears static electricity comes close to the gap 57, an electrostatic discharge can take place and may get to the flat cable 55, which is the member located closest to the exterior of the image reading device 1.

However, in this embodiment, the plate-shaped portion 43z of the frame member 43 and the corresponding wall-shaped portion 52g of the base frame 52 that is arranged to the right of the plate-shaped portion 43z in the cross-sectional view of FIG. 7B touch or almost touch each other over a large area and hence the creeping distance from the outside of the image reading device 1 to the flat cable 55 through the gap 57 is made long. This long distance prevents any electrostatic discharge from getting to the flat cable 55 by way of the gap 57. FIG. 7C shows the gap 58 that may equally be produced between the plate-shaped portion 44z of the frame member 44 (see FIG. 7A) and the base frame 52. The member of the image reading device 1 that is located closest to the outside through the gaps 58 is the read sensor 3. However, the creeping distance along the gap 58 is also made long in this embodiment and hence this long distance prevents any electrostatic discharge from getting to the read sensor 3 by way of the gap 58. Thus, as described above, the image reading device 1 of this embodiment is made to show improved resistance against static electricity and hence, if the user bears static electricity, no electrostatic discharge gets to the inside of the image reading device 1 to make the device to be less liable to be damaged by electricity.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-142536, filed Jul. 30, 2018, which is hereby incorporated by reference herein in its entirety.

What is claimed is:

1. An image reading device comprising:
    a document table having a plate-shaped transparent member for a document to be placed thereon;
    an image reading unit configured to read the document placed on an upper surface of the transparent member from a lower surface side of the transparent member, the image reading unit extending in a main scanning direction;
    a carriage for driving the image reading unit to reciprocally move in a sub-scanning direction, the sub-scanning direction being a direction intersecting the main scanning direction;
    a case for containing the carriage, the case having a support portion for supporting the document table from the lower surface side of the transparent member; and
    a frame member arranged along a peripheral edge of the transparent member;
    wherein the transparent member has a pair of first sides extending in the main scanning direction and a pair of second sides extending in the sub-scanning direction and an engagement section is provided correspondingly to each of the pair of second sides such that the case and the frame member are mutually engaged with each other at an underside of the support portion as viewed in a vertical direction.

2. The device according to claim 1, wherein the device is provided with a plurality of the engagement sections.

3. The device according to claim 1, wherein the transparent member is rectangular and the pair of the second sides extend in parallel with each other.

4. The device according to claim 1, wherein
    the case has a wall-shaped portion projecting upward and extending in the sub-scanning direction;
    the frame member has a plate-shaped portion projecting downward perpendicularly relative to the lower surface of the transparent member and extending in the sub-scanning direction; and
    the case and the frame member are configured such that a protrusion arranged on the plate-shaped portion and a groove arranged on the wall-shaped portion at a position located below the support portion and extending in the sub-scanning direction come into engagement with each other at the time when the plate-shaped portion is driven to move along the wall-shaped portion so as to slide the document table in the sub-scanning direction.

5. The device according to claim 4, wherein the wall-shaped portion is arranged so as to be perpendicular to the lower surface of the transparent member in a state where the document table is fitted to the case.

6. The device according to claim 4, further comprising:
    a rear cover arranged at one of the opposite ends of the document table as viewed in the sub-scanning direction so as to operate as stopper for stopping any move of the document table in the sub-scanning direction; and
    a document cover being fitted to the device by way of the rear cover so as to press the document placed on the transparent member against the transparent member.

* * * * *